(12) United States Patent
Borchgrevink et al.

(10) Patent No.: US 9,103,459 B2
(45) Date of Patent: Aug. 11, 2015

(54) SUBSEA VALVE ACTUATOR HAVING VISUAL MANUAL POSITION INDICATOR CONNECTED TO A MANUAL OVERRIDE SHAFT

(75) Inventors: Christian Borchgrevink, Langhus (NO); Jon Flidh, Mjondalen (NO); Paula Guimaraes, legal representative, Porto (PT); Christopher A. Flidh, legal representative, Porto (PT)

(73) Assignee: Vetco Gray Scandinavia AS, Sandvika (NO)

( * ) Notice: Subject to any disclaimer, the term of this patent is extended or adjusted under 35 U.S.C. 154(b) by 765 days.

(21) Appl. No.: 13/502,899

(22) PCT Filed: Oct. 19, 2010

(86) PCT No.: PCT/IB2010/002670
§ 371 (c)(1),
(2), (4) Date: Jun. 6, 2012

(87) PCT Pub. No.: WO2011/048469
PCT Pub. Date: Apr. 28, 2011

(65) Prior Publication Data
US 2012/0234410 A1    Sep. 20, 2012

(30) Foreign Application Priority Data
Oct. 21, 2009   (NO) .................................... 20093189

(51) Int. Cl.
*F16K 37/00* (2006.01)
*F16K 31/04* (2006.01)

(52) U.S. Cl.
CPC ........... *F16K 37/0008* (2013.01); *F16K 31/041* (2013.01); *Y10T 137/8225* (2015.04); *Y10T 137/8275* (2015.04)

(58) Field of Classification Search
CPC .............. F16K 37/0008; F16K 31/041; F16K 37/0016; F16K 31/055; Y10T 137/8225
USPC ............ 137/553; 251/129.4, 129.11; 116/277
See application file for complete search history.

(56) References Cited

U.S. PATENT DOCUMENTS 1,386,065 A * 8/1921 Lofton .......................... 116/277
4,213,480 A   7/1980 Orum et al.
(Continued)

FOREIGN PATENT DOCUMENTS

| CN | 86 1 00605 A | 7/1986 |
| CN | 86100605 A | 7/1986 |
| EP | 0 013 266 A1 | 9/1980 |
| EP | 0 384 607 A2 | 8/1990 |

OTHER PUBLICATIONS

CN Office Action dated Apr. 23, 2014 from corresponding CN Application No. 201080048167.5
(Continued)

*Primary Examiner* — Atif Chaudry
(74) *Attorney, Agent, or Firm* — Bracewell & Giuliani LLP

(57) ABSTRACT

A subsea valve actuator is disclosed, comprising an override shaft (6) reaching from inside a fluid filled and pressure compensated actuator housing (1) to the exterior thereof via a bearing and sealing arrangement (7), wherein a visual valve position indicator (14) is arranged exterior to the actuator housing. The visual indicator (14) is pivotally mounted to the override shaft and guided non-rotatably to be forced in axial displacement on the override shaft when the override shaft is rotated, wherein the mounting of the visual indicator (14) on the override shaft (6) is encased in a fluid filled, pressure compensated indicator mounting enclosure (19) surrounding the override shaft (6) in sealing (26) relation outside of the actuator housing (1).

18 Claims, 3 Drawing Sheets

(56) References Cited

U.S. PATENT DOCUMENTS

| | | | |
|---|---|---|---|
| 4,406,303 A | | 9/1983 | Kilmoyer |
| 4,622,994 A | * | 11/1986 | Rosaen .................. 137/557 |
| 5,497,672 A | * | 3/1996 | Appleford et al. ........... 74/89.29 |
| 6,487,960 B1 | | 12/2002 | Chatufale |
| 2002/0124889 A1 | | 9/2002 | Sundararajan |
| 2008/0251745 A1 | * | 10/2008 | Liberale et al. .......... 251/129.04 |

OTHER PUBLICATIONS

PCT International Search Report from International Application No. PCT/IB2010/002670 dated Feb. 1, 2011.

Search Report and Written Opinion for counterpart Singapore patent application No. 201202232-3 dated Jul. 3, 2014.

Second Office Action and Search Report for counterpart Chinese patent application No. 201080048167.5 dated Apr. 23, 2014.

* cited by examiner

SUBSEA VALVE ACTUATOR HAVING VISUAL MANUAL POSITION INDICATOR CONNECTED TO A MANUAL OVERRIDE SHAFT

RELATED APPLICATION

This application claims priority to PCT application PCT/IB2010/002670 filed Oct. 19, 2010, which claims priority to Norwegian patent application NO 20093189filed Oct. 21, 2009.

BACKGROUND OF THE INVENTION

1. Field Of The Invention

The present invention relates to a subsea valve actuator comprising an override shaft reaching from inside a fluid filled and pressure compensated actuator housing to the exterior thereof via a bearing and sealing arrangement, wherein a valve position indicator is arranged visible on the exterior of the actuator housing.

2. Description Of The Related Art

Basically, valves for subsea production fluids operate at great depths and corresponding high pressure, low temperature and in conditions of poor visibility. An accurate operation of the valve is crucial and failure may result in loss of production, environmental pollution or safety hazards. A subsea valve is typically remotely controlled through valve actuators that are hydraulically or electrically driven for shifting the valve between open, closed and any intermediate positions. The position of the valve may be monitored remotely by means of a position sensor arranged in the actuator and connected to a control centre at a host facility. In a case of failure in the valve positioning system or in the valve position detection function, subsea valve actuators are often arranged for manual shifting of the valve by overriding the actuator's normal drive system in response to a visual inspection of the valve position, both of which are accomplished on site by divers or by remotely operated vehicles (ROV).

Subsea valve actuators having manual override and visual position indicator means are previously known. Examples are found in EP 0 384 607 A1, US 2003/0116200 A1, U.S. Pat. No. 6,487,960 B1, U.S. Pat. No. 4,213,480 A, e.g.

In a prior art valve actuator, the manual override comprises an override shaft which engages the drive system and which reaches out from a pressure compensated actuator housing with a shaft end that is accessible for manual shifting of the valve. An indicator for the valve position is likewise accessible for visual inspection from outside the actuator housing. The visual indicator comprises an indicator needle attached to a shaft that reaches into the actuator housing and is connected to the drive system via pinion and reduction gears. Besides a mechanically complex structure to ensure synchronization between the movement of the valve and the corresponding reading of the indicator, each penetration of the actuator housing involves a potential risk for ingress of sea water, or the risk of bleeding from the actuator housing which is typically filled with oil or grease.

SUMMARY OF THE INVENTION

The present invention aims at a reduction of the mechanical complexity of the prior subsea valve actuator having a manual override and a valve position indicator which is visually readable from outside an actuator housing.

Another object of the present invention is to reduce the number of penetrations into the housing of the subsea valve actuator having manual override and a valve position indicator which is visually readable from outside the actuator housing.

The objects are met in a subsea valve actuator as introduced above, comprising a visual valve position indicator arranged exterior to the actuator housing and pivotally mounted to the override shaft and guided non-rotatably to be forced in axial displacement on the override shaft when the override shaft is rotated, wherein the mounting of the visual indicator on the override shaft is encased in a fluid filled, pressure compensated indicator mounting enclosure which surrounds the override shaft in a sealing relation outside of the actuator housing.

By the combined arrangement of the override and visual indicator facilities external to the actuator housing there is achieved an arrangement of non-complex mechanical structure. Through the arrangement of pressure compensation there is accomplished a visual indicator which is protected from seawater, and which operates unaffected by pressure and pressure differentials. No additional penetration of the wall of the actuator housing is required besides the unavoidable lead-through of the override shaft.

In a preferred realization of the invention, the override shaft is formed with a flow passage by which fluid flow communication is established between the pressure compensated interior of the actuator housing and the interior of the indicator mounting enclosure.

In another advantageous realization of the invention, the indicator mounting enclosure is in fluid flow communication with an external pressure compensator.

The external pressure compensator may be located in an indicator housing included in a penetrator assembly adapted for introducing the override shaft into the actuator housing.

The indicator mounting enclosure preferably comprises a first fluid filled chamber which is separated from a second fluid filled chamber through a carrier that is mounted in rotary-to-linear motion conversion engagement with the override shaft.

Advantageously and preferred, the carrier is mounted in threaded engagement with the override shaft. An alternative embodiment foresees a carrier formed with a pin that engages a helical groove formed on the periphery of the override shaft.

In a preferred embodiment, the indicator mounting enclosure comprises a first fluid filled chamber which is separated from a second fluid filled chamber through a carrier that is mounted in rotary-to-linear motion conversion engagement with the override shaft, wherein each of said first and second chambers communicates with the interior of the actuator housing via the flow passage formed in the override shaft.

The flow passage in the override shaft can be realized as an axial bore mounting in the inner end of the override shaft, connecting with the indicator mounting enclosure via transverse bores mounting on the periphery of the override shaft within the first and second chambers, respectively. Multiple and at least two transverse bores are preferably arranged to mount within each of the first and second chambers.

The recited measures provide fluid flow into and out from the first and second chambers, the volumes of which will vary in response to the axial displacement of the indicator carrier upon rotation of the override shaft.

An alternative embodiment, however less preferred for sealing purposes, foresees a flow passage arranged as an axial groove recessed from the surface of the override shaft.

Further in order to permit unhindered fluid flow between the first and second chambers, one or more flow passages may additionally be formed through the carrier. A fluid flow communication between the first and second chambers may in addition or alternatively be established as fluid leakage via a self-cleaning threaded engagement between the carrier and the override shaft.

In the preferred realization of the invention the first and second chambers are defined by extendable/compressible bellows surrounding the override shaft, each bellow in one end connected to and following the movement of the carrier, and in the opposite end stationary connected to a house portion of an indicator housing.

In one preferred embodiment, the carrier is operatively linked to an indicator needle which is actuated by the carrier to move in linear movement over a scale.

In another preferred embodiment, the carrier is pivotally linked to an indicator needle which is actuated by the carrier to move in pivoting movement over an arcuate scale.

In both embodiments, the indicator needle is extended to reach through a wall of the indicator housing, and the scale is arranged on the exterior of the indicator housing.

The indicator mounting enclosure may be arranged in an indicator housing forming a penetrator assembly which is connectable to the actuator housing, and by which the override shaft is introduced into the actuator housing. An inner end of the indicator housing carries the bearing and sealing arrangement, whereas the outer end of the indicator housing carries a corresponding sealing arrangement and a journal bearing for the override shaft.

BRIEF DESCRIPTION OF THE DRAWINGS

The invention will be further explained below with reference made to the drawings. In the drawings.

DETAILED DESCRIPTION

Figure 1:
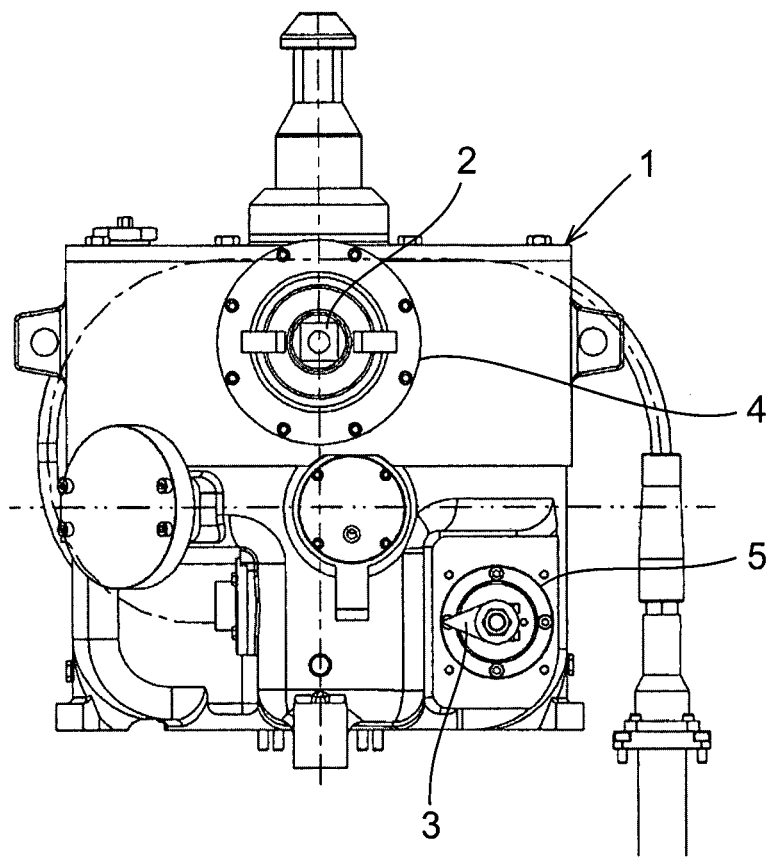
FIG. 1 is a side view of a prior art valve actuator comprising a manual override and visual valve position indicator.

A hydraulically operated subsea valve actuator included in the prior art is shown in FIG. 1, comprising valve shifting components arranged for shifting a valve (not shown) between open and closed positions. The valve shifting components are enclosed in an actuator housing 1 which is arranged for connection to a subsea valve. An override shaft 2 and a visual valve position indicator 3 are separately introduced into the actuator housing via sealing arrangements 4 and 5, each of which provides a barrier between the ambient sea and the fluid filled and pressure compensated interior of the actuator housing 1. Inside the actuator housing, the override shaft 2 and visual indicator 3 are each and separately operatively connected to the valve shifting mechanism via pinion and reduction gear assemblies.

Figure 2:
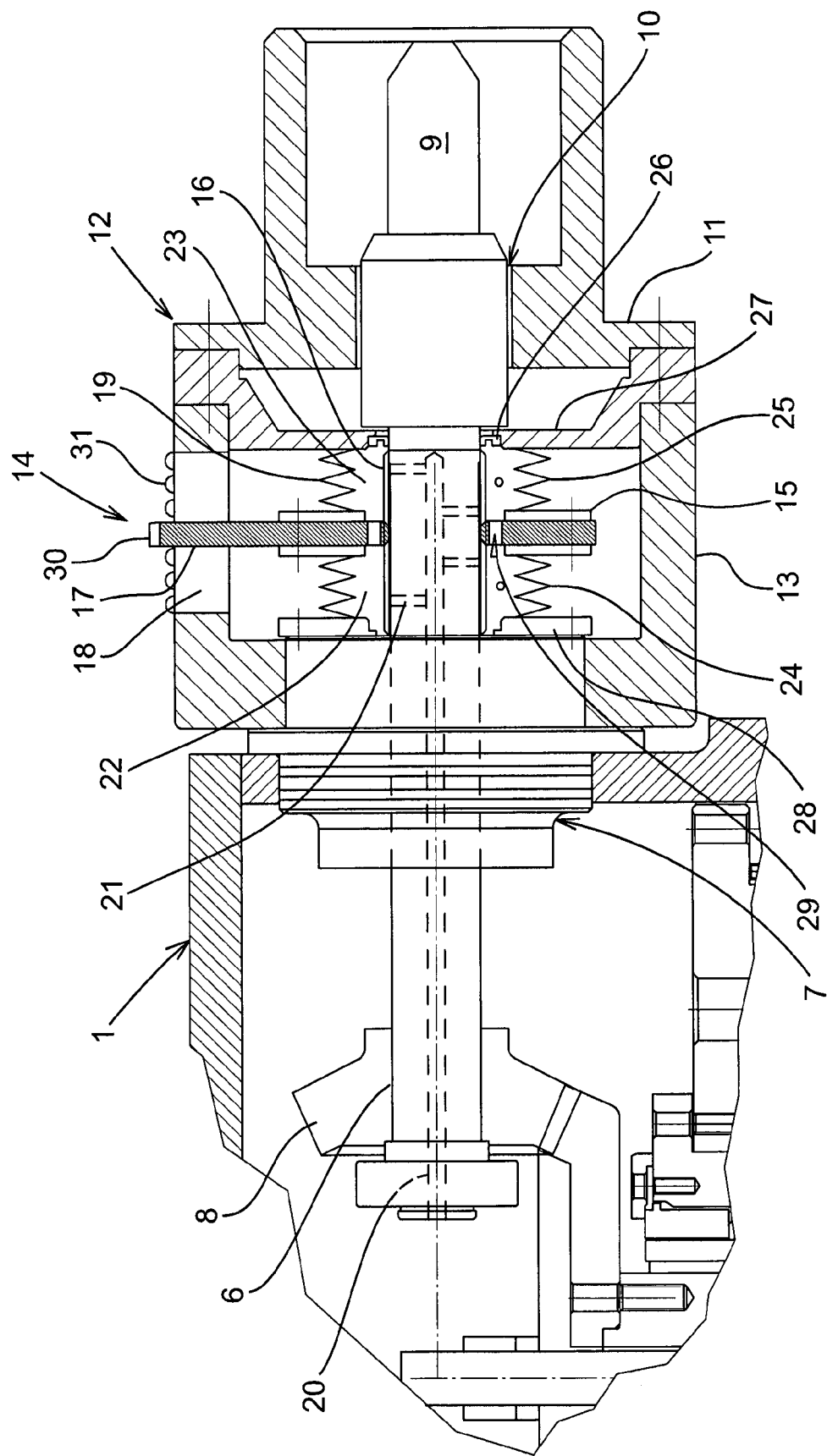
FIG. 2 is a partially sectioned side view of the combined override and visual valve position indicator according to the present invention, schematically illustrating an embodiment of the invention.

The combined override and visual indicator in a valve actuator according to the present invention is illustrated schematically in FIG. 2. An override shaft 6 is introduced in an actuator housing 1 via a bearing, and sealing arrangement 7. An inner end of the override shaft carries a pinion gear 8 engaging a ring gear comprised in a rotary valve shifting mechanism. The opposite or outer end of the override shaft 6 has a shaft end 9 of standard dimension which is exposed and accessible for manual rotation of the override shaft and the valve shifting mechanism, this way overriding the normal drive of the valve shifting mechanism. Axially inside of the shaft end 9, the override shaft 6 is rotatably journalled at 10 in a house portion 11 included in an indicator housing, generally identified by reference sign 12. The house portion 11 is fastened to the end of an indicator housing wall 13 enclosing an axial length of the override shaft, basically between the bearing and sealing arrangement 7 and the house portion 11. The indicator housing 12 represents a penetrator assembly which is connectable to the actuator housing and by which the override shaft 6 is introduced into the pressure compensated interior of the actuator housing.

Figure 3:
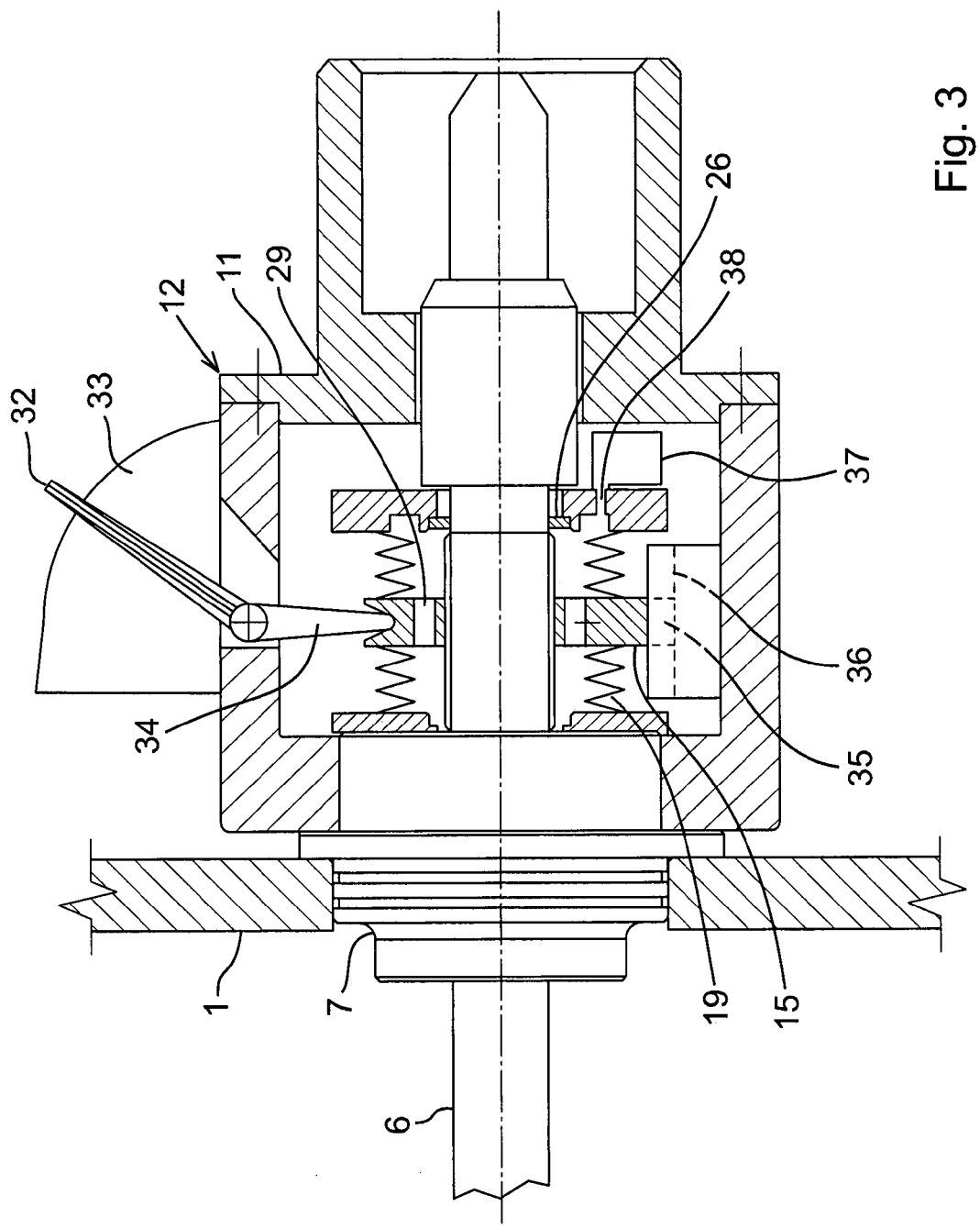
FIG. 3 is a corresponding view illustrating another embodiment of the combined override and visual valve position indicator.

A visual position indicator means, in the drawings of FIGS. 2 and 3 generally identified by reference number 14, comprises a carrier 15 which has a through hole threaded internally, and by which the indicator means 14 is mounted in threaded engagement with a threaded portion 16 formed externally on the override shaft 6. The carrier 15 is non-rotationally guided through a member 17 which projects to be received for sliding motion in a slot 18 that is formed through the wall 13 of the indicator housing 12. The carrier 15 is in this way forced into axial displacement on the override shaft, when the override shaft is rotated. Synchronization between the reading or length of displacement of the carrier 15 and the number of turns of the override shaft, which is required to shift the valve between the fully open and fully closed positions, is determined by the angle of threads and may be adjusted to the subject valve application.

The mounting of the indicator means 14 on the override shaft 6 is protected from contact with seawater by means of an indicator mounting enclosure 19, essentially encasing the axial length of the override shaft internally of the indicator housing 12. The internal pressure in the indicator mounting enclosure 19 is adjusted to the ambient seawater pressure. In the illustrated example, the indicator mounting enclosure 19 is filled with a fluid in flow communication with the fluid-filled and pressure compensated interior of the actuator housing 1. This flow communication is established via a flow passage 20 which is formed as a bore in the override shaft 6. The flow passage 20 mounts in the inner end of the override shaft, and connects to the interior of the indicator mounting enclosure 19 via transverse bores 21 mounting on the surface of the override shaft. Notably, the bores 21 are arranged to mount on each side of the carrier 15, the carrier forming a partition member which separates a first chamber 22 from a second chamber 23 of the indicator mounting enclosure 19. In order to establish flow communication with the interior of the actuator housing, regardless of position of the carrier 15 on the override shaft 6, multiple bores 21 may be arranged axially separated in the override shaft.

Preferably, the first and second chambers are defined as illustrated through first and second expandable/compressible bellows 24 and 25, respectively. The bellows 24 and 25 are in one respective end sealingly connected to the carrier 15, following the same under expansion and compression as the carrier is displaced on the override shaft. In the opposite ends, the bellows are stationary and sealingly connected to the indicator housing 12. The override shaft 6 exits from the indicator mounting enclosure 19 via a seal 26 which is seated in a house portion 27 to which the stationary end of bellows 25 is connected. The stationary end of bellows 24 may be correspondingly connected to a house portion 28, or connected to the bearing and sealing arrangement 7 via which the drive shaft 6 enters into the actuator housing 1. The override shaft 6 thus passes through the indicator mounting enclosure 19 in a sealing relation.

The volumes of the bellows thus shift in response to the rotation of the override shaft. In order to further ensure unrestricted fluid flow into and out from the chambers of changing volumes, flow passages 29 are preferably additionally formed through the carrier 15 to provide fluid flow between the first and second chambers defined through the bellows 24 and 25.

The indicator means 14 comprises an indicator needle moving with the carrier 15. In a preferred embodiment, illustrated in FIG. 2, an indicator needle 30 is operatively linked to the carrier 15 and reaches to the outside of the indicator housing via a slot in the wall 13 of the indicator housing, so as to be moved by the carrier in a linear motion over a scale 31 which is arranged on the exterior of the indicator housing 12. For purpose of illustration, the scale 31 is shown in the drawing as indication marks raised from the outer surface of the indicator housing.

Feasible Modifications of the Illustrated Embodiments

Modifications to the above embodiment are possible. Instead of an indicator needle 30 moving linearly over a scale 31, an alternative indicator needle 32 may be arranged pivotally linked to the carrier 15 so as to be moved by the carrier in a pivoting motion over an arcuate scale 33, as illustrated in FIG. 3. In the drawing, reference number 34 refers to a member of a link mechanism which is pivotally engaging the carrier in an axial plane through the override shaft. The link member 34 converts the axial displacement of the carrier 15 into a pivotal motion of the indicator needle 32, while on the other hand a portion 35 of the carrier 15 projects into a guide 36 which prevents the carrier from rotation with the override shaft 6.

In alternative to a threaded engagement between the carrier 15 and the override shaft 6 as disclosed, an embodiment is foreseen wherein a rotary-to-linear motion conversion engagement is realized as a pin and groove combination wherein a pin on the carrier engages a helical groove formed in the surface of the override shaft, e.g.

In another alternative embodiment, see FIG. 3, flow communication via the override shaft is omitted and pressure compensation is instead accomplished by means of an external pressure compensator 37 in flow communication at 38 with the interior of the indicator mounting enclosure 19. In this embodiment, an external pressure compensator may be disposed inside as illustrated, or outside the indicator housing 12 if appropriate.

It is further conceivable to establish flow communication between the first and second chambers of the indicator mounting enclosure 19 as a leak flow via self-cleaning threads in the mounting of the indicator means 14 on the override shaft.

In alternative to the bellows 24 and 25, e.g., an indicator mounting enclosure may be realized as rigid, oppositely arranged cylinders reaching with their open ends towards an inter-disposed carrier which is designed to travel similar to a piston in reciprocating motion in the cylinders, in response to rotation of the override shaft.

Instead of a central bore through the override shaft, flow communication between the indicator mounting enclosure and the actuator housing may alternatively be accomplished via an axial groove in the surface of the override shaft, e.g.

Although disclosed in connection with a pinion gear drive it shall be understood, that the present invention is not limited to an angular disposition of the override shaft and visual indicator, but is equally applicable to all-axial and axially off-set and parallel installations.

Through the measures disclosed above, a subsea valve actuator is provided which is reliable both in aspects of operation, resulting from a combined override and visual indicator of non-complex mechanical structure, and in aspects of its handling in result of high accessibility for monitoring and manipulation of the valve position by divers or by means of remotely operated vehicles in a subsea environment.

The invention claimed is:

1. A subsea valve actuator, comprising
an override shaft that reaches from inside a fluid filled and pressure compensated actuator housing to the exterior thereof via a bearing and sealing arrangement, wherein a visual valve position indicator is arranged exterior to the actuator housing, the visual indicator pivotally mounted to the override shaft and guided non-rotatably to be forced in axial displacement on the override shaft when the override shaft is rotated and wherein the mounting of the visual indicator on the override shaft is encased in a fluid filled, pressure compensated indicator mounting enclosure surrounding the override shaft in sealing relation outside of the actuator housing, and wherein the override shaft is formed with a flow passage by which fluid flow communication is established between the pressure compensated interior of the actuator housing and the interior of the indicator mounting enclosure.

2. The subsea actuator of claim 1, wherein the indicator mounting enclosure is in fluid flow communication with an external pressure compensator.

3. The subsea actuator of claim 2, wherein the external pressure compensator is located in an indicator housing included in a penetrator assembly adapted for introducing the override shaft into the actuator housing.

4. The subsea actuator of claim 1, wherein the indicator mounting enclosure comprises a first fluid filled chamber which is separated from a second fluid filled chamber through a carrier which is mounted in rotary-to-linear motion conversion engagement with the override shaft.

5. The subsea actuator of claim 4, wherein at least one flow passage is formed through the carrier, permitting fluid flow between the first and second chambers.

6. The subsea actuator of claim 4, wherein the first and second chambers are defined by extendable/compressible bellows surrounding the override shaft, each bellows in one end connected to the carrier and in the opposite end stationary connected to a house portion of an indicator housing.

7. The subsea actuator of claim 4, wherein the carrier is mounted in threaded engagement with the override shaft.

8. The subsea actuator of claim 7, wherein fluid leakage between the first and second chambers of the indicator mounting enclosure is permitted via a self-cleaning threaded engagement between the carrier and the override shaft.

9. The subsea actuator of claim 4, wherein the carrier is operatively linked to an indicator needle which is actuated by the carrier to move in linear movement over a scale.

10. The subsea actuator of claim 9, wherein the indicator needle reaches through a wall of the indicator housing, and in that the scale is arranged on the exterior of the indicator housing.

11. The subsea actuator of claim 4, wherein the carrier is pivotally linked to an indicator needle which is actuated by the carrier to move in pivoting movement over an arcuate scale.

12. The subsea actuator of claim 11, wherein the indicator needle reaches through a wall of the indicator housing and the scale is arranged on the exterior of the indicator housing.

13. The subsea actuator of claim 1, wherein the indicator mounting enclosure comprises a first fluid filled chamber which is separated from a second fluid filled chamber through a carrier which is mounted in rotary-to-linear motion conversion engagement with the override shaft, and wherein each of said first and second chambers communicates with the interior of the actuator housing via the flow passage in the override shaft.

14. The subsea actuator of claim 13, wherein the flow passage in the override shaft is an axial bore mounting in the inner end of the override shaft, connecting with the indicator mounting enclosure via transverse bores mounting on the periphery of the override shaft within the first and second chambers, respectively.

15. The subsea actuator of claim 14, wherein multiple and at least two transverse bores are arranged to mount within each of the first and second chambers, respectively.

16. The subsea actuator of claim 1, wherein the indicator mounting enclosure is arranged in an indicator housing forming a penetrator assembly which is connectable to the actuator housing and by which the override shaft is introduced into the actuator housing, the indicator housing in an inner end thereof carrying the bearing and sealing arrangement and in an outer end carrying a corresponding sealing arrangement and a journal bearing for the override shaft.

17. A subsea valve actuator comprising:
an override shaft
a visual valve position indicator disposed exterior to the actuator housing and pivotally mounted to the override shaft and guided non-rotatably to be forced in axial displacement on the override shaft when the override shaft is rotated and wherein the mounting of the visual indicator on the override shaft is encased in a fluid filled, pressure compensated indicator mounting enclosure surrounding the override shaft in sealing relation outside of the actuator housing and in fluid flow communication with an external pressure compensator that is located in an indicator housing included in a penetrator assembly adapted for introducing the override shaft into the actuator housing.

18. The subsea valve actuator of claim 17, further comprising an actuator housing and a sealed bearing assembly in a sidewall of the actuator housing, wherein the actuator housing is pressure compensated and contains fluid, and wherein a portion of the override shaft is disposed in the actuator housing and projects through the sealed bearing assembly.

* * * * *